Figure 1:
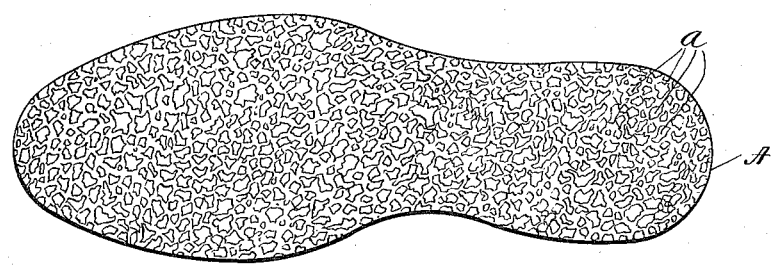

W. NORRIS.
METHOD OF PREPARING STRIPS OF RUBBER FOR ATTACHMENT TO LEATHER AND THE PRODUCT.
APPLICATION FILED JUNE 22, 1914.

1,182,200.  Patented May 9, 1916.

WITNESSES:  INVENTOR:
M. E. Flaherty.  Webster Norris
Q. E. O'Brien  By
  his attorneys.

UNITED STATES PATENT OFFICE.

WEBSTER NORRIS, OF NORTH BROOKFIELD, MASSACHUSETTS, ASSIGNOR TO THE B & R RUBBER COMPANY, OF NORTH BROOKFIELD, MASSACHUSETTS, A CORPORATION OF MASSACHUSETTS.

METHOD OF PREPARING STRIPS OF RUBBER FOR ATTACHMENT TO LEATHER AND THE PRODUCT.

1,182,200.  Specification of Letters Patent.  Patented May 9, 1916.

Application filed June 22, 1914. Serial No. 846,570.

*To all whom it may concern:*

Be it known that I, WEBSTER NORRIS, of North Brookfield, in the county of Worcester and State of Massachusetts, a citizen of the United States, have invented a new and useful Method of Preparing Strips of Rubber for Attachment to Leather and the Product, of which the following is a specification.

My invention broadly comprises a method of cementing together a rubber surface and a surface of some other material. It is especially adapted for use in making shoes where it is desired to attach a rubber outer sole to the leather insole. Such rubber soles are sewed at the edge and are often cemented also, but it is very difficult to get good adhesion between the rubber, the cement and the leather unless the leather or rubber surface or both are buffed or otherwise roughened. My invention is intended to save this labor and provide a simple and inexpensive method of making a good and permanent adhesion between a rubber and a leather or other surface, whether in the manufacture of soles or otherwise, and it consists in vulcanizing into the inner or attaching surface of the rubber pulverized cork or some similar substance so that in attaching the rubber by cement to a leather or other surface the cement being applied to this surface inlaid with cork will attach the rubber to the other surface.

To practise my invention I take the sheet rubber or rubber compound before it is vulcanized and apply to one surface thereof a thin layer of rubber cement of some suitable character. This cemented surface I sprinkle or otherwise cover with pulverized cork so that the cork will not fall off in putting the sheet into the vulcanizer. One way of applying the cork is to rub the surface in a tray which contains pulverized cork. The pieces of cork should be say not over an eighth of an inch in size. The rubber is then put into the vulcanizing mold and pressure is applied so that the cork is driven into the surface of the rubber and is vulcanized therein by the usual process. When shoe soles, for example, are made out of this material, having been cut to the proper shape, the cork side is next covered with adhesive cement of suitable character and is placed against the leather or other sole and preferably stitched around the edge. The middle portion of the soles are thus cemented together firmly so that the rubber sole has the double attachment, viz: by stitching and by cement and if the stitches do not hold the cement will.

I have shown in the drawings a shoe constructed according to my method, in which—

Figure 2:
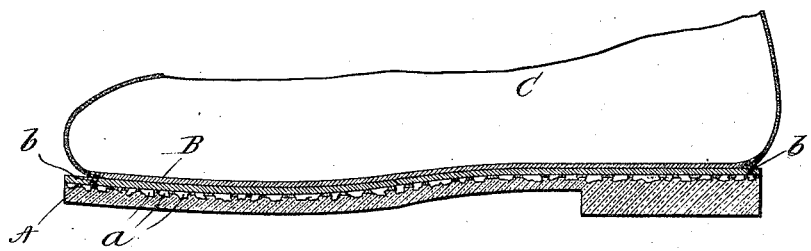

Figure 1 is a plan of such a sole, and Fig. 2 a longitudinal section showing the rubber sole attached to the leather sole of a shoe.

A is the rubber sole, $a$ being the particles of cork vulcanized into the upper surface.

B is the inner sole of the shoe, usually of leather, C being the upper.

$b$ indicates the means for attaching the inner sole B to the upper C.

While my invention is especially adapted to the attachment of rubber soles to shoes, it is evident that it may be otherwise used. Moreover, with some rubber compounds it is not necessary to cement the cork particles to the rubber before vulcanizing, and instead of cork sawdust or other like particles which will give an adhesive surface may be used.

What I claim as my invention is:—

1. The method of preparing rubber for cementing to other materials which consists in vulcanizing particles of adhesive material under pressure into one surface of a rubber sheet.

2. The method of preparing rubber for cementing to other materials which consists in covering one surface thereof with cement, sprinkling cementable particles thereon, then vulcanizing the whole under pressure whereby the particles will be forced into the surface of the rubber and held therein by the rubber after its vulcanization.

3. A sheet of rubber compound having a surfacing of cementable particles integral therewith.

4. A sheet of material the body of which is composed of rubber compound and one surface of which has particles of cork vulcanized therein to be integral therewith.

WEBSTER NORRIS.

Witnesses:
W. Du Mont,
M. E. Mahoney.